United States Patent
Curley et al.

(10) Patent No.: US 7,585,002 B2
(45) Date of Patent: Sep. 8, 2009

(54) EXPANDABLE TUBULAR CONNECTION

(75) Inventors: Eric J. Curley, Houston, TX (US);
Mark K. Adam, Houston, TX (US);
Leopoldo S. Gomez, Humble, TX (US);
Robert S. O'Brien, Katy, TX (US);
John L. Baugh, College Station, TX (US)

(73) Assignee: Baker Hughes Incorporated, Houston, TX (US)

( * ) Notice: Subject to any disclaimer, the term of this patent is extended or adjusted under 35 U.S.C. 154(b) by 83 days.

(21) Appl. No.: 11/065,814

(22) Filed: Feb. 25, 2005

(65) Prior Publication Data
US 2005/0236834 A1    Oct. 27, 2005

Related U.S. Application Data

(60) Provisional application No. 60/563,950, filed on Apr. 21, 2004.

(51) Int. Cl.
*F16L 25/00* (2006.01)
(52) U.S. Cl. ............... 285/333; 285/334; 285/382.4
(58) Field of Classification Search ............... 285/333, 285/334, 417, 382.4
See application file for complete search history.

(56) References Cited

U.S. PATENT DOCUMENTS

| | | | |
|---|---|---|---|
| 3,497,246 A | 2/1970 | Weiner | |
| RE30,647 E | 6/1981 | Blose | |
| 4,298,221 A | 11/1981 | McGugan | |
| 4,373,750 A | 2/1983 | Mantelle et al. | |
| 4,561,683 A | 12/1985 | Lumsden et al. | |
| 4,679,831 A * | 7/1987 | Kielminski | 285/332.2 |
| 4,796,923 A * | 1/1989 | Liggins et al. | 285/27 |
| 5,066,052 A * | 11/1991 | Read | 285/334 |
| 5,474,334 A * | 12/1995 | Eppink | 285/184 |
| 5,681,059 A | 10/1997 | Mackie | |
| 5,709,417 A | 1/1998 | Verbeck | |
| 5,709,418 A * | 1/1998 | Benson et al. | 285/382.2 |
| 5,738,388 A | 4/1998 | Sundelin | |
| 5,794,985 A * | 8/1998 | Mallis | 285/93 |
| 5,954,374 A | 9/1999 | Gallagher et al. | |
| 6,056,324 A | 5/2000 | Reimert et al. | |
| 6,409,175 B1 | 6/2002 | Evans et al. | |
| 6,554,287 B1 | 4/2003 | Sivley, IV et al. | |
| 6,607,220 B2 | 8/2003 | Sivley, IV | |
| 6,619,696 B2 * | 9/2003 | Baugh et al. | 285/92 |
| 6,626,471 B2 | 9/2003 | Mallis | |
| 6,712,401 B2 * | 3/2004 | Coulon et al. | 285/331 |

(Continued)

FOREIGN PATENT DOCUMENTS

DE    3542523    *  2/1985    ............. 285/333

(Continued)

*Primary Examiner*—David E Bochna
(74) *Attorney, Agent, or Firm*—Steve Rosenblatt

(57) ABSTRACT

An expandable tubular pin and box connection is described having a feature of trapping the pin nose after preferably deforming the pin nose plastically in an outward direction away from the longitudinal axis of the connection. The box end is held away from the pin wall before expansion so that its tendency to curl inwardly upon expansion causes it to bend against the pin wall for sealing with it. The thread profile is also optimized to reduce flank separation as a result of expansion.

21 Claims, 3 Drawing Sheets

U.S. PATENT DOCUMENTS

| | | |
|---|---|---|
| 6,792,665 B2 | 9/2004 | Baugh et al. |
| 6,893,055 B2 * | 5/2005 | Thomas et al. .............. 285/319 |
| 6,896,052 B2 | 5/2005 | Simpson et al. |
| 7,040,018 B2 | 5/2006 | Lohbeck et al. |
| 2002/0033603 A1 * | 3/2002 | Pallini et al. ................ 285/333 |
| 2003/0234538 A1 | 12/2003 | Hashem |
| 2004/0090068 A1 | 5/2004 | Evans et al. |
| 2004/0194278 A1 | 10/2004 | Brill et al. |
| 2005/0087983 A1 | 4/2005 | Verger et al. |

FOREIGN PATENT DOCUMENTS

| | | |
|---|---|---|
| EP | 0094509 A2 | 11/1983 |
| FR | 2844574 | 3/2004 |
| GB | 1246385 | 9/1971 |
| GB | 2407593 A | 5/2005 |
| GB | 2394237 A | 4/2007 |
| WO | 01/33131 A1 | 5/2001 |
| WO | 02/16724 A2 | 2/2002 |
| WO | 02/068854 A1 | 9/2002 |
| WO | WO02095181 A1 | 11/2002 |
| WO | 03032331 A2 | 4/2003 |
| WO | 2004/009950 A1 | 1/2004 |
| WO | 2004/010039 A2 | 1/2004 |
| WO | 2004/027786 A2 | 4/2004 |
| WO | 2004079246 A1 | 9/2004 |

\* cited by examiner

EXPANDABLE TUBULAR CONNECTION

PRIORITY INFORMATION

This application claims the benefit of U.S. Provisional Application No. 60/563,950, filed on Apr. 21, 2004.

FIELD OF THE INVENTION

The field of this invention relates to pipe connections to be expanded and more particularly pin and box connections and couplings for downhole tubulars to be expanded after makeup.

BACKGROUND OF THE INVENTION

Oilfield tubulars are joined at their ends with threads. Typically, the male or pin thread on a tubular to be run into a wellbore is screwed to the female or box end of the tubular previously run into the wellbore. There are many thread designs available for normal well applications that don't involve expansion. However, when tubulars are expanded problems with known thread designs have occurred. In some cases the load flanks on the thread have spread apart allowing for leakage under pressure conditions. In other cases, the pin or box have failed from stress cracks due to the expansion. In yet other cases, the pin end of the connected joint shrank longitudinally due to the expansion and curled inwardly putting itself in the way of moving other tools or equipment through the expanded connection. In yet other circumstances, the combination of flank separation from expansion and applied pressure allowed fluid leakage to the outside of the connection past the box nose.

Various designs for expandable threaded oilfield tubular connections have been devised. Examples of some of the more contemporary designs can be seen in U.S. Pat. Nos. 6,409,175; 6,607,220 and 6,604,763.

The present invention seeks to address issues of connection failure by addressing issues relating to flank separation, pin end curling and fluid leakage past the box end to the exterior of the connection. A variety of embodiments are presented both in the form of a threaded pin and box and coupling type connections. Those skilled in the art will more readily appreciate the scope of the invention from the claims that appear below and the examples relating to the below described preferred embodiments.

SUMMARY OF THE INVENTION

An expandable tubular pin and box connection is described having a feature of trapping the pin nose after preferably deforming the pin nose plastically in an outward direction away from the longitudinal axis of the connection. The box end is held away from the pin wall before expansion so that its tendency to curl inwardly upon expansion causes it to bend against the pin wall for sealing with it. The thread profile is also optimized to reduce flank separation as a result of expansion.

DETAILED DESCRIPTION OF THE DRAWINGS

DETAILED DESCRIPTION OF THE PREFERRED EMBODIMENT

Figure 1:
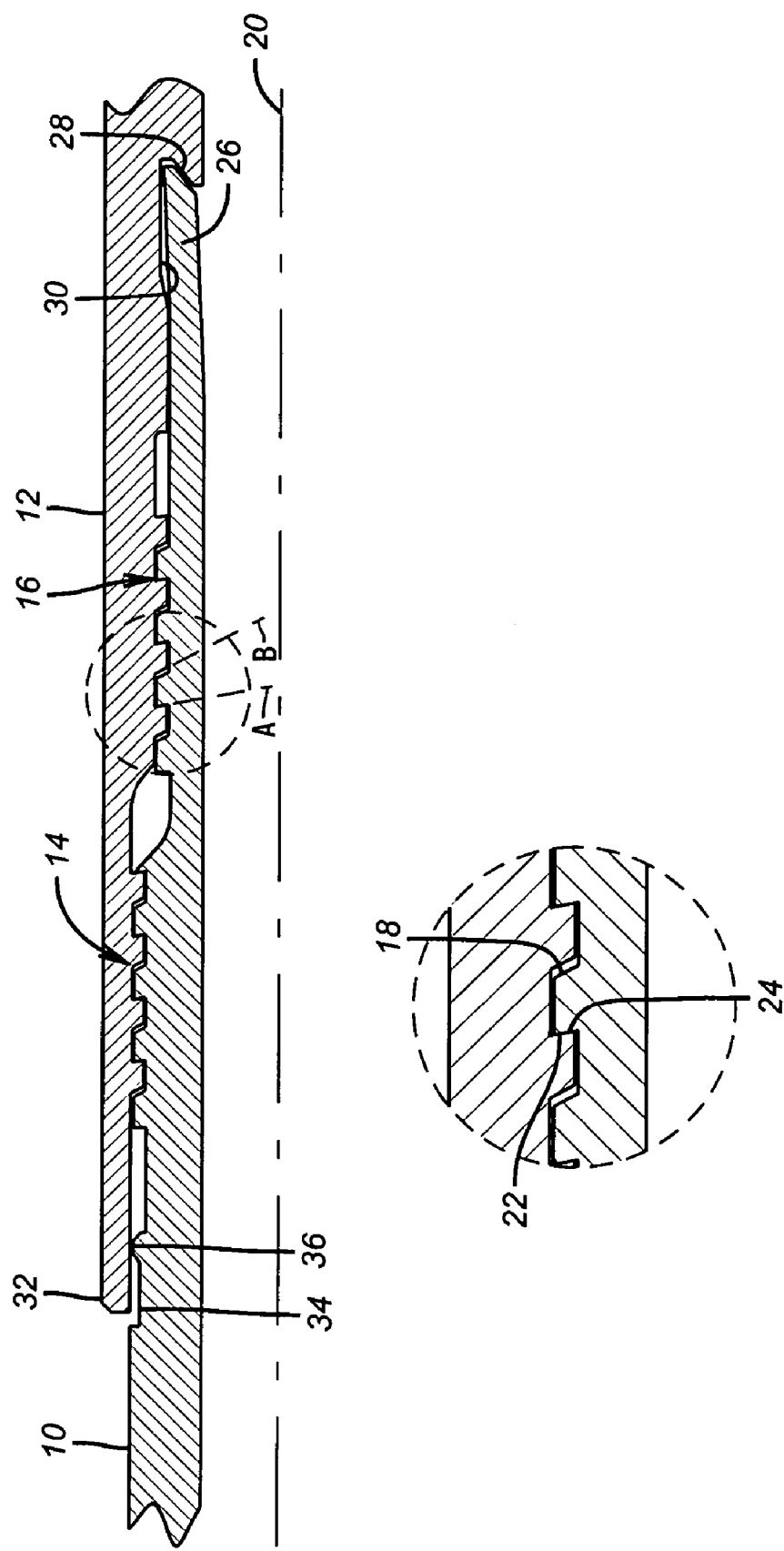
FIG. 1 shows a made up pin and box prior to expansion and a detail of the thread profile.

Referring to FIG. 1 the pin 10 is shown threaded to the box 12 in a two-step thread 14 and 16. The leading portion of the pin thread 18 preferably makes an angle of about 60° plus or minus about ½° with the longitudinal axis 20 as reflected in angle B. The trailing side of the pin thread 22, which carries the makeup load, is preferably oriented at angle A with respect to the longitudinal axis 20, where angle A is preferably about 80° plus or minus about ½°. These orientations on the pin thread that are matched by the corresponding box thread have been determined to minimize gapping after expansion between opposed surfaces 22 on the pin and 24 on the box. The separation occurs during expansion due to differential longitudinal shrinkages between the pin 10 and the box 12. Those skilled in the art will appreciate that while a two-step thread is shown the invention encompasses other thread types with one or more steps. The invention seeks to address the issue of thread separation resulting from expansion and the preferred embodiment is illustrative of a type of thread that works toward that goal, recognizing that other variations of known thread designs that currently exhibit this separation phenomenon can be undertaken to minimize such separation within the scope of the invention.

The pin 10 has a nose 26 that is captured on makeup by a reverse torque shoulder 28. Shoulder 28 can have a variety of orientations up to a radial orientation with respect to axis 20. The objective is to capture the nose 26 and plastically deform it in a direction away from axis 20. Doing this has several advantages. First, despite longitudinal shrinkage due to expansion, the nose 26 remains captured by shoulder 28. Secondly, since nose 26 is a free end of pin 10, expansion would normally tend to not only shrink it in length but also make it curl inwardly toward the axis 20. Plastically deforming it on makeup resists this curling effect. Additionally, the plastic deformation on makeup also provides sealing contact between the nose 26 and surface 30 on the inside of the box 12 both before and continuing after expansion.

The box 12 has an end 32 that is cantilevered above pin surface 34, as shown on the left side of FIG. 1. A projection 36, which can come in a variety of designs and quantities, lifts or maintains end 32 from surface 34 on makeup. Depending on the height of the projection 36 end 32 may either be pushed away from axis 20 or not, upon makeup. However, after expansion end 32 will shrink longitudinally and will also tend to curl inwardly into a sealing contact with pin surface 34 to create an external seal in the vicinity of projection 36.

Figure 2:
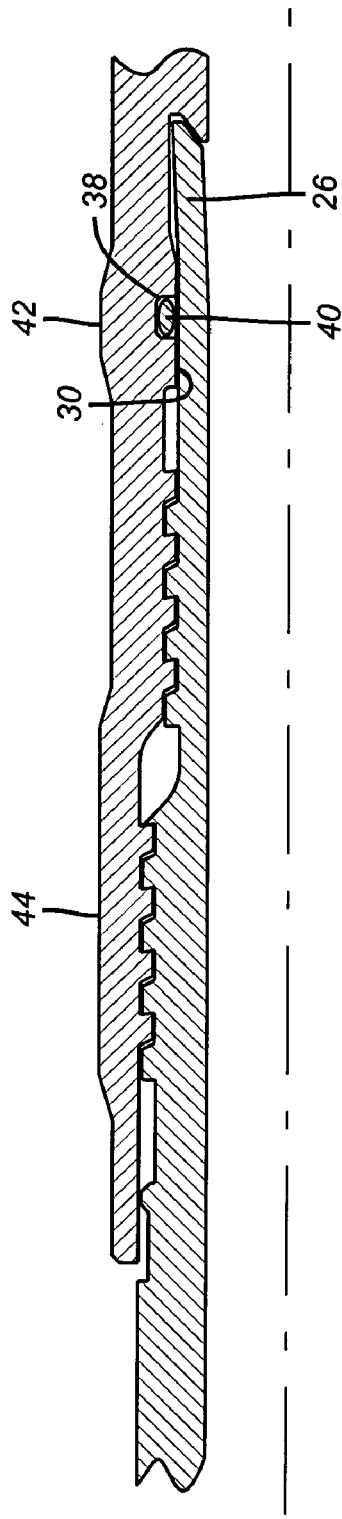
FIG. 2 is an alternative embodiment of FIG. 1 having a seal in the box and varying wall thickness in the box.

FIG. 2 is similar to FIG. 1 with the addition of a groove 38 in which there is a seal ring 40 to further seal between surface 30 on the box 12 and the pin nose 26. To make up for the reduced wall thickness caused by groove 38, the box 12 has a thick section 42 to help retain the pressure rating of the expanded connection, which will thin as a result of expansion. For similar reasons, a thick section 44 is provided in the thread area on box 12.

Figure 3:
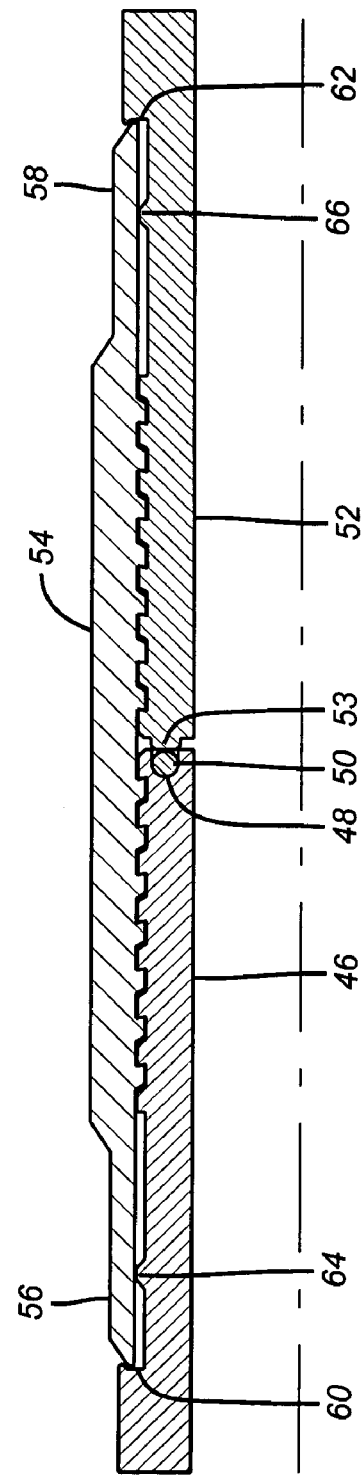
FIG. 3 shows a coupling joint before expansion featuring a soft seal between the tubular ends.

FIG. 3 illustrates a coupling connection featuring tubular 46 having a groove 48 at its end to hold a soft seal 50. Tubular 52 has a projection 53 to touch the seal 50 when the two tubulars are placed in an abutting relationship. A coupling 54 joins tubulars 46 and 52. Preferably, shoulders 60 and 62 located respectively on the tubulars 46 and 52 respectively capture both ends 56 and 58 of the coupling 54. This capture preferably bends the ends 56 and 58 and preferably into the plastic deformation range. Tubulars 46 and 52 respectively have projections 64 and 66 for the same purpose as previously described with regard to projection 36. The thread surface orientations can also be along the preferred angles described with regard to FIG. 1. Seal 48 is a soft material, preferably an elastomer, but can be another material that meets the temperature and chemical exposure requirements of the application. Coupling 54 is thicker in the threaded region to compensate for anticipated wall thinning resulting from expansion. Upon expansion, ends 56 and 58 will curl into a sealing or a further sealing relationship with tubulars 46 and 52 respectively. The capture of end or ends 56 and 58 can also create some sealing contact even before expansion.

Figure 4:
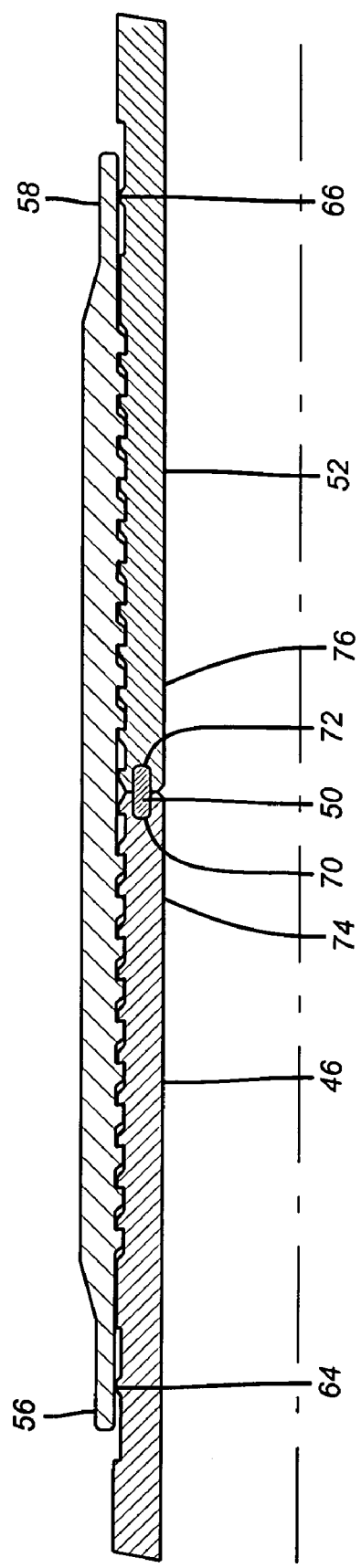
FIG. 4 shows a made up coupling before expansion including a metallic seal between the tubular ends.

FIG. 4 is an alternative to FIG. 3. Here ends 56 and 58 are not captured but are still cantilevered over projections 64 and 66. Instead of the soft seal 48 there is a more rigid ring seal 68 that extends into grooves 70 and 72 respectively in tubulars 46 and 52. What is different in FIG. 4 is that the seal 68 is sufficiently rigid to hold the ends 74 and 76 together during and through expansion and to help hold those ends against their tendency to curl inwardly due the expansion. Optionally, ends 56 and 58 can still be captured, as described with regard to FIG. 3. The thread form can preferably have the configuration described in FIG. 1.

Those skilled in the art will appreciate that surfaces 22 and 24 help keep the thread together during expansion. Surface 18 provides ease of makeup. The illustrated thread can be quick started or blunt started because the thin feather or incomplete portion of the thread is removed to facilitate makeup. It should also be noted that the contact between end 32 and projection 36 in FIG. 1 could create a metal-to-metal seal even before expansion. The same effect can be realized for the designs of FIGS. 3 and 4. When the coupling design is used, as shown in FIGS. 3 and 4, the coupling 54 can be of a different composition that the tubulars 46 and 52. This allows the use of a more expansion friendly material for the coupling 54 that also can have higher notch tolerance so that it will be less likely to allow stress cracks to form on expansion. Single or multi-step threads are envisioned. The amount of expansion can be in the order of about 22% and the preferred material is L80 for its high strength against burst and collapse despite a lower ductility when compared to stainless steels.

The above description is illustrative of the preferred embodiment and many modifications may be made by those skilled in the art without departing from the invention whose scope is to be determined from the literal and equivalent scope of the claims below:

The invention claimed is:

1. An expandable connection having a longitudinal axis, comprising:
    a pin having a nose and connectible to a box having a nose, said pin and box comprise threads that are rotationally engaged in order to longitudinally advance said nose into said box;
    said box forming a non-vented shoulder comprising adjacent surfaces with one surface having sufficient length to retain said pin nose radially away from said longitudinal axis and force said nose against the other of said surfaces upon contact resulting from said thread engagement, said contact continuing despite longitudinal relative dimensional change between said nose and said shoulder resulting from mechanical expansion apart from thermal effects with said threads engaged, to prevent said pin nose from curling toward said longitudinal axis;
    said pin nose is bent away from the longitudinal axis from a force generated from engagement of said threads.

2. The connection of claim 1, wherein:
    said pin comprises a thread having a leading angle of about 60 degrees with respect to the longitudinal axis and a trailing angle of about 80 degrees with said longitudinal axis.

3. An expandable connection having a longitudinal axis, comprising:
    a pin having a nose and connectible to a box having a nose, said pin and box comprise threads that are rotationally engaged in order to longitudinally advance said nose into said box;
    said box forming a non-vented shoulder comprising adjacent surfaces with one surface having sufficient length to retain said pin nose radially away from said longitudinal axis and force said nose against the other of said surfaces upon contact resulting from said thread engagement, said contact continuing despite longitudinal relative dimensional change between said nose and said shoulder resulting from mechanical expansion apart from thermal effects with said threads engaged, to prevent said pin nose from curling toward said longitudinal axis;
    said pin nose is bent away from the longitudinal axis from a force generated from engagement of said threads;
    said pin nose is plastically deformed away from the longitudinal axis upon initial makeup to said box.

4. An expandable connection having a longitudinal axis, comprising:
    a pin having a nose and connectible to a box having a nose, said pin and box comprise threads that are rotationally engaged in order to longitudinally advance said nose into said box;
    said box forming a non-vented shoulder comprising adjacent surfaces with one surface having sufficient length to retain said pin nose radially away from said longitudinal axis and force said nose against the other of said surfaces upon contact resulting from said thread engagement, said contact continuing despite longitudinal relative dimensional change between said nose and said shoulder with said threads engaged to prevent said pin nose from curling toward said longitudinal axis;
    said pin nose is bent away from the longitudinal axis from a force generated from engagement of said threads;
    said box nose is held away from said pin upon makeup.

5. The connection of claim 4, wherein:
    said box nose is cantilevered on a projection.

6. The connection of claim 4, wherein:
    said box nose curls toward said pin upon expansion.

7. An expandable connection having a longitudinal axis, comprising:
    a pin having a nose and connectible to a box having a nose, said pin and box comprise threads that are rotationally engaged in order to longitudinally advance said nose into said box;
    said box forming a non-vented shoulder comprising adjacent surfaces with one surface having sufficient length to retain said pin nose radially away from said longitudinal axis and force said nose against the other of said surfaces upon contact resulting from said thread engagement, said contact continuing despite longitudinal relative dimensional change between said nose and said shoulder with said threads engaged to prevent said pin nose from curling toward said longitudinal axis;
    said pin nose is bent away from the longitudinal axis from a force generated from engagement of said threads;
    said box further comprises a groove containing a seal and an increased wall thickness aligned with said groove, said seal contacting said pin to maintain a seal therewith.

8. An expandable connection having a longitudinal axis, comprising:
a pin having a nose and connectible by a first thread to a second thread on a box having a nose;
said box nose is selectively cantilevered beyond a support that extends from said pin and is spaced apart from said threads over said pin defining a free end of said box nose, said free end disposed in a spaced relation from said pin when said pin and box are made up, without an intermediate resilient seal in the spaced relation between said box nose and said pin and without exterior grooves designed to focus and/or localize expansion stresses, thereby providing an unimpeded path for said free end to contact said pin upon expansion of said made up pin and box.

9. An expandable connection having a longitudinal axis, comprising:
a pin having a nose and connectible to a box having a nose without exterior grooves designed to focus and/or localize expansion stresses;
said box nose is selectively radially held away from said pin by a support defining a free end of said box nose beyond said support, said free end disposed in a spaced relation from said pin on makeup and selectively landed on said pin on expansion of said pin and box after makeup;
said box nose is cantilevered on a projection from said pin.

10. The connection of claim 9, wherein:
said box nose curls toward said pin upon expansion.

11. The connection of claim 10, wherein:
said box retaining said pin nose during expansion to prevent said pin nose from curling toward said longitudinal axis.

12. An expandable connection having a longitudinal axis, comprising:
a pin having a nose and connectible to a box having a nose;
said box nose is radially held away from said pin by a support defining a free end of said box nose beyond said support, said free end disposed in a spaced relation from said pin on makeup and selectively landed on said support and in contact with said pin;
said box nose is cantilevered on a projection from said pin;
said box nose curls toward said pin upon expansion;
said box retaining said pin nose during expansion to prevent said pin nose from curling toward said longitudinal axis;
said box further comprises a groove containing a seal and an increased wall thickness aligned with said groove, said seal contacting said pin to maintain a seal therewith.

13. The connection of claim 12, wherein:
said pin comprises a thread having a leading angle of about 60 degrees with respect to the longitudinal axis and a trailing angle of about 80 degrees with said longitudinal axis.

14. An expandable coupled connection, comprising:
a first tubular aligned on a longitudinal axis with a second tubular and joined by a coupling having a first end overlapping said first tubular and a second end overlapping said second tubular;
at least one of said ends of said coupling being radially held away from said adjacent tubular upon makeup to form a gap therebetween by a support disposed in said gap said gap lacking an intermediate resilient seal in said gap between said coupling and an adjacent tubular thereby providing an unimpeded gap between said end and said adjacent tubular, said end, upon expansion of said end and said coupling causing plastic deformation thereof, contacts said adjacent tubular.

15. The connection of claim 14, wherein:
at least one of said ends of said coupling is retained against curling away from said longitudinal axis upon expansion.

16. The connection of claim 15, wherein:
said first and second tubulars have ends disposed adjacent each other for makeup with a seal retained therebetween.

17. A coupled connection, comprising:
a first tubular aligned on a longitudinal axis with a second tubular and joined by a coupling having a first end overlapping said first tubular and a second end overlapping said second tubular;
at least one of said ends of said coupling being radially held away from said adjacent tubular to form a gap therebetween by a support disposed in said gap said gap lacking an intermediate resilient seal in said gap between said coupling and an adjacent tubular thereby providing an unimpeded gap between said end and said adjacent tubular for said end to selectively contact said adjacent tubular;
at least one of said ends of said coupling is retained against curling away from said longitudinal axis upon expansion;
said retained end is plastically deformed toward said longitudinal axis upon makeup.

18. A coupled connection, comprising:
a first tubular aligned on a longitudinal axis with a second tubular and joined by a coupling having a first end overlapping said first tubular and a second end overlapping said second tubular;
at least one of said ends of said coupling being radially held away from said adjacent tubular to form a gap therebetween by a support disposed in said gap said gap lacking an intermediate resilient seal in said gap between said coupling and an adjacent tubular thereby providing an unimpeded gap between said end and said adjacent tubular for said end to selectively contact said adjacent tubular;
said coupling comprises a thread having a leading angle of about 60 degrees with respect to the longitudinal axis and a trailing angle of about 80 degrees with said longitudinal axis.

19. A coupled connection, comprising:
a first tubular aligned on a longitudinal axis with a second tubular and joined by a coupling having a first end overlapping said first tubular and a second end overlapping said second tubular;
at least one of said ends of said coupling being radially held away from said adjacent tubular to form a gap therebetween by a support disposed in said gap said gap lacking an intermediate resilient seal in said gap between said coupling and an adjacent tubular thereby providing an unimpeded gap between said end and said adjacent tubular for said end to selectively contact said adjacent tubular;
at least one of said ends of said coupling is unrestrained upon makeup;
said first and second tubulars have ends disposed adjacent each other for makeup with a seal retained therebetween, said seal being sufficiently rigid to keep said ends of said first and second tubulars in alignment during expansion.

20. The connection of claim 19, wherein:
said holding away results from a projection.

21. A coupled connection, comprising:

a first tubular aligned on a longitudinal axis with a second tubular and joined by a coupling having a first end overlapping said first tubular and a second end overlapping said second tubular;

at least one of said ends of said coupling being radially held away from said adjacent tubular to form a gap therebetween by a support disposed in said gap said gap lacking an intermediate resilient seal in said gap between said coupling and an adjacent tubular thereby providing an unimpeded gap between said end and said adjacent tubular for said end to selectively contact said adjacent tubular;

said coupling being thicker adjacent a thread thereon as compared to said end held away from said adjacent tubular.

* * * * *